(12) United States Patent
Allen et al.

(10) Patent No.: US 8,788,480 B2
(45) Date of Patent: *Jul. 22, 2014

(54) MULTIPLE CANDIDATE SELECTION IN AN ENTITY RESOLUTION SYSTEM

(75) Inventors: Thomas B. Allen, Las Vegas, NV (US); Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,411

(22) Filed: Sep. 10, 2012

(65) Prior Publication Data

US 2013/0066851 A1 Mar. 14, 2013

Related U.S. Application Data

(63) Continuation of application No. 12/748,596, filed on Mar. 29, 2010, now Pat. No. 8,352,460.

(51) Int. Cl.
*G06F 17/30* (2006.01)

(52) U.S. Cl.
USPC .......................................... 707/713; 707/769

(58) Field of Classification Search
USPC ......... 707/708, 713, 718, 754, 758, 759, 767, 707/771, 780, 999.002, 999.003, 999.004, 707/999.005, 999.006, 769, 770
See application file for complete search history.

(56) References Cited

U.S. PATENT DOCUMENTS

| | | | |
|---|---|---|---|
| 5,802,515 A | 9/1998 | Adar et al. | |
| 5,812,840 A | 9/1998 | Shwartz | |
| 5,960,430 A | 9/1999 | Haimowitz et al. | |
| 6,169,986 B1 | 1/2001 | Bowman et al. | |
| 6,631,496 B1 | 10/2003 | Li et al. | |
| 7,403,942 B1 | 7/2008 | Bayliss | |
| 7,584,221 B2 | 9/2009 | Robertson et al. | |
| 7,664,742 B2 * | 2/2010 | Pettovello | 707/715 |
| 7,730,060 B2 | 6/2010 | Chakrabarti et al. | |
| 8,032,546 B2 | 10/2011 | Arasu et al. | |
| 8,352,460 B2 * | 1/2013 | Allen et al. | 707/713 |
| 2003/0233356 A1 | 12/2003 | Dean et al. | |
| 2004/0019593 A1 | 1/2004 | Borthwick et al. | |
| 2006/0041537 A1 | 2/2006 | Ahmed | |
| 2007/0294221 A1 | 12/2007 | Chen et al. | |
| 2008/0189279 A1 | 8/2008 | Mayer et al. | |
| 2008/0294635 A1 | 11/2008 | Dietz et al. | |
| 2009/0006349 A1 | 1/2009 | Fuxman et al. | |
| 2009/0089332 A1 | 4/2009 | Harger et al. | |
| 2009/0089630 A1 | 4/2009 | Goldenberg et al. | |

(Continued)

OTHER PUBLICATIONS

Terrovitis Manolis, et al., Privacy-preserving Anonymization of Set-valued Data, Proceedings of the VLDB Endowment, vol. 1, Issue 1, Aug. 2008, pp. 115-125, published by Association for Computing Machinery.

(Continued)

*Primary Examiner* — Greta Robinson
(74) *Attorney, Agent, or Firm* — Patterson & Sheridan, LLP (57) ABSTRACT

Systems, methods and articles of manufacture are disclosed for matching an inbound identity record to existing entities. Entity resolution (ER) candidate-building keys may be determined for a received identity record. A query may be generated from the ER candidate-building keys. When executing the query, a generic key may be identified. Execution of the query may be aborted upon a condition involving the generic key being satisfied.

24 Claims, 5 Drawing Sheets

(56) References Cited

U.S. PATENT DOCUMENTS

| | | |
|---|---|---|
| 2009/0094416 A1 | 4/2009 | Baeza-Yates et al. |
| 2009/0182755 A1 | 7/2009 | Adair et al. |
| 2009/0198678 A1 | 8/2009 | Conrad et al. |
| 2009/0198686 A1 | 8/2009 | Cushman, II et al. |
| 2009/0259659 A1 | 10/2009 | Mericle |
| 2009/0271694 A1 | 10/2009 | Bayliss |
| 2010/0121839 A1* | 5/2010 | Meyer et al. ............... 707/720 |
| 2010/0161566 A1* | 6/2010 | Adair et al. ............... 707/690 |
| 2010/0169360 A1 | 7/2010 | Cohen et al. |
| 2010/0223269 A1 | 9/2010 | Shuf et al. |
| 2011/0099192 A1 | 4/2011 | Ravikumar et al. |
| 2011/0119280 A1 | 5/2011 | Kuo et al. |
| 2011/0238654 A1 | 9/2011 | Allen et al. |
| 2011/0264651 A1 | 10/2011 | Selvaraj et al. |
| 2012/0078949 A1 | 3/2012 | Allen et al. |
| 2012/0215808 A1 | 8/2012 | Allen et al. |

OTHER PUBLICATIONS

International Search Report and Written Opinion dated Dec. 16, 2011 for PCT/EP2011/065311.

Weis, Melanie, Duplicate Detection in XML Data, Dissertation, Dec. 4, 1983, University of Berlin, Berlin, Germany.

Benjelloun et al.; "D-Swoosh: A Family of Algorithms for Generic, Distributed Entity Resolution", ICDCS 27th Inter. Conf. on, Jun. 25-27, 2007, 10 pages.

Singla et al.; "Entity Resolution with Markov Logic", ICDM Sixth International Conference on, Dec. 18-22, 2006, pp. 2-11.

Bhattacharya et al.; "Query-Time Entity Resolution", Journal of Artificial Intelligence Research 30, Published Dec. 2007, pp. 621-657.

\* cited by examiner

FIG. 1

| FIELD | VALUE |
|---|---|
| NAME | BOB PATRICK SMITH |
| ADDRESS_1 | 123 MAIN ST. McCLEAN, VA 22222 |
| ADDRESS_2 | 456 SECOND ST. TYSONS, VA 22222 |
| ADDRESS_3 | 789 WEST ELM RD. FREMONT, CA 98343 |
| SSN | 111-22-3333 |
| PHONE_1 | 702-555-1212 |
| PHONE_2 | 702 438-1342 |

FIG. 2

| KEY TYPE | KEY VALUE |
|---|---|
| NAME | SMITH BOB<br>SMITH PAT<br>SMITH ROBRT<br>SMITH PATRC<br>SMYTH BOB<br>SMYTH PATRC |
| ADDRESS | 123 MANST VA 2222<br>456 2NDST VA 2222<br>789 ELMRD CA 9834 |
| SSN | SSN333322111 |
| PHONE | PH2121555207<br>PH2431834207 |

MULTIPLE CANDIDATE SELECTION IN AN ENTITY RESOLUTION SYSTEM

This application is a continuation of co-pending U.S. patent application Ser. No. 12/748,596, filed Mar. 29, 2010. The aforementioned related patent application is herein incorporated by reference in its entirety.

BACKGROUND

Embodiments of the invention relate to techniques for entity resolution. More specifically, embodiments of the invention relate to multiple candidate selection in an identity resolution system.

DETAILED DESCRIPTION

Identity resolution applications typically perform one or both of identity resolution and relationship resolution. Identity resolution attempts to answer the question "Who is who?"—i.e., determines whether multiple records that appear to describe different identities actually refer to the same entity (e.g., individual). For example, records identifying two women with different last names may in fact refer to the same woman having both a familial surname and a married surname. Relationship resolution attempts to answer the question "Who knows whom?" in order to determine benefits and/or risks of relationships among identities, such as customers, employees, vendors, and so forth, e.g., by cross-referencing data from various sources. For example, a relationship may be identified between two individuals sharing a common address or telephone number. An example of an identity resolution application is InfoSphere Identity Insight, available from International Business Machines Corp. (IBM®) of Armonk, N.Y.

SUMMARY

One embodiment of the invention includes a computer-implemented method. The method may generally include receiving an identity record; determining a plurality of entity resolution (ER) candidate-building keys for the received identity record; generating a query from the plurality of ER candidate-building keys to retrieve entities matching any of the plurality of ER candidate-building keys, wherein each ER candidate-building key is derived from at least a field of the received identity record; identifying, during execution of the query, a generic ER candidate-building key from the plurality of ER candidate-building keys, wherein the generic ER candidate-building key includes an ER candidate-building key that is unsuitable for generating candidate entities for the identity record; upon identifying the generic ER candidate-building key, aborting executing the query.

Another embodiment of the invention includes a computer readable storage medium containing a program, which, when executed, performs an operation. The operation may generally include receiving an identity record; determining a plurality of entity resolution (ER) candidate-building keys for the received identity record; generating a query from the plurality of ER candidate-building keys to retrieve entities matching any of the plurality of ER candidate-building keys, wherein each ER candidate-building key is derived from at least a field of the received identity record; identifying, during execution of the query, a generic ER candidate-building key from the plurality of ER candidate-building keys, wherein the generic ER candidate-building key includes an ER candidate-building key that is unsuitable for generating candidate entities for the identity record; upon identifying the generic ER candidate-building key, aborting executing the query.

Still another embodiment of the invention includes a system having one or more computer processors and a memory containing a program, which when executed by the one or more computer processors is configured to perform an operation. The operation may generally include receiving an identity record; determining a plurality of entity resolution (ER) candidate-building keys for the received identity record; generating a query from the plurality of ER candidate-building keys to retrieve entities matching any of the plurality of ER candidate-building keys, wherein each ER candidate-building key is derived from at least a field of the received identity record; identifying, during execution of the query, a generic ER candidate-building key from the plurality of ER candidate-building keys, wherein the generic ER candidate-building key includes an ER candidate-building key that is unsuitable for generating candidate entities for the identity record; upon identifying the generic ER candidate-building key, aborting executing the query.

BRIEF DESCRIPTION OF THE SEVERAL VIEWS OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide techniques for identity resolution. One embodiment of the invention provides an application configured to resolve identity records to entity accounts, each representing a distinct individual. For example, when "Bob Smith" checks into a hotel room, a home address and telephone number from hotel check-in records may be used to match him as being the same person as an entity account for a "Robert Smith" having the same address and phone number. To match "Bob Smith" to the entity account for "Robert Smith", the identity record representing "Bob Smith" is compared to a set of individuals, each represented by a set of identity records (referred to as an entity). However, comparing the record for "Bob Smith" to each entity one-by-one may often be impractical. For example, the count of entities may be too large for one-by-one matching to be practical. Further, retrieving all entities over a computer network for matching purposes may lead to unacceptable delays in matching. Thus, in one embodiment, a set of candidate entities is generated to be matched against the identity record. That is, rather than matching the identity record against all known entities, the identity record is matched only against the set of candidate entities. Candidate entities may be selected by locating a set of shared keys between the identity record and the entity. Advantageously, the application may resolve an inbound identity record to known entities more efficiently. For example, the application may match "Bob Smith" to a set of records for "Robert Smith" more efficiently than matching to all known entities.

In one embodiment, to identify the set of candidate entities, the application may generate a set of entity resolution (ER) candidate-building keys from the inbound identity record. As used herein, an ER candidate-building key for a given identity record refers to a string that is used to build a set of candidate entities to be matched against the identity record, to resolve the identity record to known entities. As an example, the application may generate ER candidate-building keys "Bob", "Bobby", and "Robert" from the first name in the inbound identity record for "Bob Smith." However, some ER candidate-building keys may be ill-suited for identifying candidate entities. For example, the ER candidate-building key "Bobby" may generate so many matching entities that it is not worthwhile for the application to process all of the matching entities. An ER candidate-building key deemed by the application to be unsuitable for identifying candidate entities may be referred to herein as a generic ER candidate-building key (or simply, generic key).

In one embodiment, the application may execute a query to retrieve entities matching any of the ER candidate-building keys. As described above, in some cases, the application may identify an ER candidate-building key as being a generic key. For example, the generic key may be defined as an ER candidate-building key that generates a count of matches that exceeds a specified threshold (e.g., 1000 records). The application may add the generic key to a list of known generic keys. Generic keys may be removed from queries subsequently executed by the application. Further, the application may abort execution of the query upon a condition being satisfied. For example, the condition may include processing ten entities subsequent to identifying the generic key.

If the application aborts execution of the query, the application may remove the generic key from the query to produce a modified query. The application executes the modified query to retrieve entities matching any of the remaining ER candidate-building keys. (The application may repeat the steps described above until the query executes to completion.) Once an original query or modified query executes to completion, the application may process entities matching non-generic keys (i.e., "candidate" entities) to match the inbound identity record to one or more of the candidate entities.

As described above, the application may execute the query to retrieve entities matching any of the ER candidate-building keys, i.e., rather than executing a query for each of the ER candidate-building keys. Advantageously, the application may retrieve candidate entities more efficiently by reducing the number of network roundtrips between the application and a data source storing the entities. Further, the application may abort execution of the query upon the condition being satisfied—such as processing a specified count of records beyond a predefined threshold. Consequently, the application may remove any generic keys from the ER candidate-building keys more efficiently—i.e., without having to execute the query to completion and/or evaluate a large number of entities matching the generic keys (which do little to help resolve an identity record to a known entity). As used herein, a generic key refers to an ER candidate-building key that matches too many entities to be helpful in matching the inbound identity record. Thus, the application may more efficiently match the inbound identity record by excluding generic keys (and corresponding entities—i.e., entities matching the generic keys) from the query. Note, however, that some of the corresponding entities may still be in the set of candidate entities if there is a match with a non-generic key. For example, the application may prevent an existing identity record having a name of "Bob Smith" and a ZIP code of 98343 from being added to the candidate set if "Bob Smith" is identified as a generic key. However, the existing identity record may nevertheless be added to the candidate set by virtue of the ZIP code (or another) field.

Further, one embodiment of the invention processes inbound identity records and generates alerts based on relevant identities, conditions, activities, or events. The process of resolving identity records and detecting relationships between identities may be performed using a pre-determined or configurable identity resolution rules. Typically, relationships between two identities are derived from information in identity records that indicate a relationship between the two identities. (e.g., a shared address, employer, telephone number, etc.). Two examples of such rules include the following:

If the inbound identity record has a matching "Social Security Number" and close "Full Name" to an existing identity, then resolve the new identity to the existing identity.

If the inbound identity record has a matching "Phone Number" to an existing identity, then create a relationship between the identity of the inbound identity record and the one with the matching phone number.

The first rule adds a new inbound record to an existing identity, where the second creates a relationship between two identities based on the inbound record. Of course, the identity resolution rules may be tailored based on the type of inbound identity records and to suit the needs of a particular case.

In one embodiment, the application may also include rules for detecting relevant identities, identities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an identity with an assigned role of "Employee" has a strong relationship to an identity with an assigned role of "Vendor"). As another example, an alert rule may be defined as a combination of both methods (e.g., alert whenever an identity with the "Nevada Gaming Black List" role also has the "Hotel Guest" role and the hotel involved is located in the state of "Nevada"). Of course, the relevance rules used may be tailored to suit the needs of a particular case.

In one embodiment, the identity resolution application generates an alert when the existence of a particular identity record (typically an inbound record being processed) causes some condition to be satisfied that is relevant in some way and that may require additional scrutiny by a user (e.g., a business analyst, an investigator of a police department, etc.). The result of these processes is typically a list of alerts about identities that should be examined by the user. Such alerts may assist the user in identifying both benefits (e.g., potential opportunities) and risks (e.g., potential threats and/or fraud).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
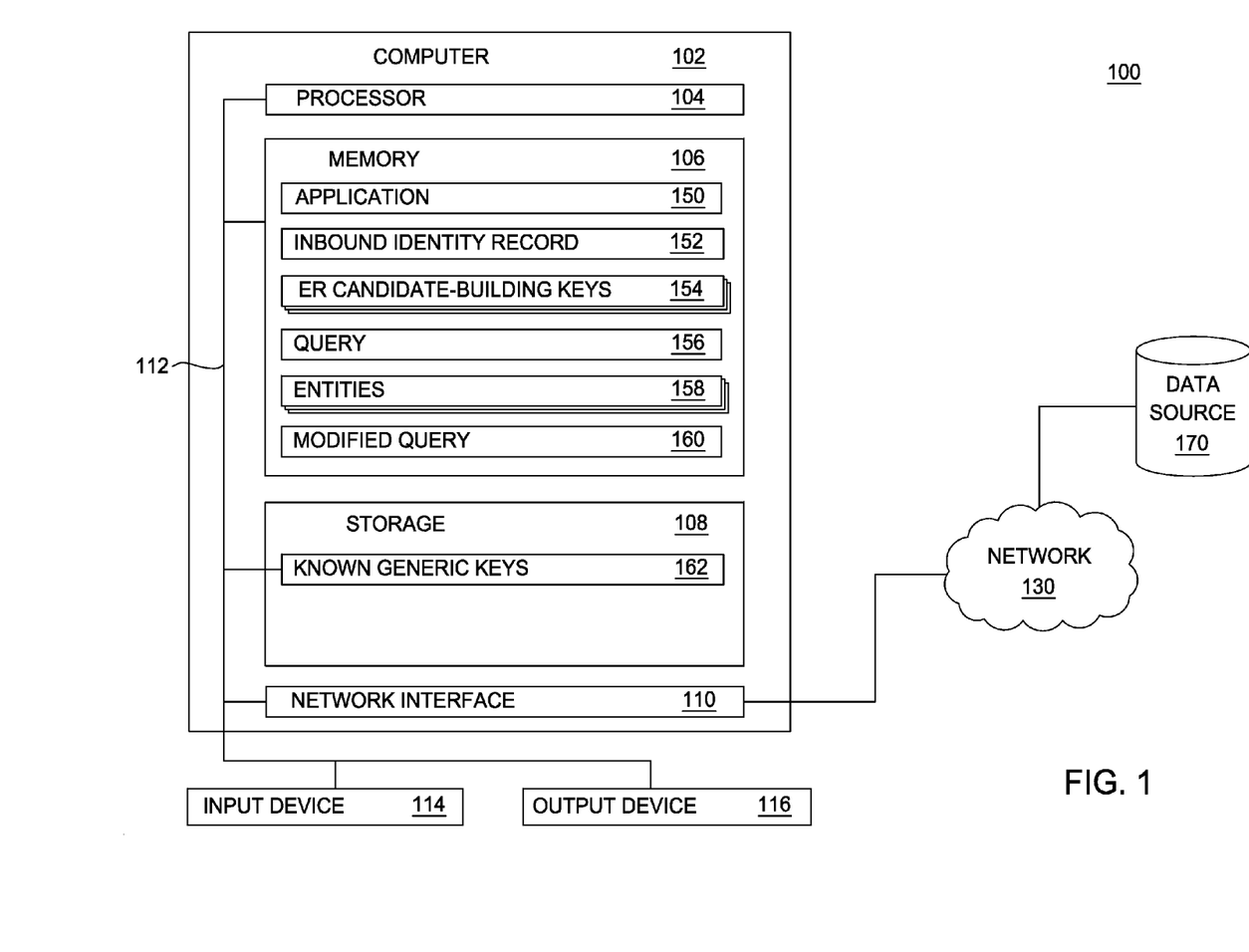
FIG. 1 is a block diagram illustrating a system for matching an inbound identity record against existing entities, according to one embodiment of the invention.

FIG. 1 is a block diagram illustrating a system 100 for matching an inbound identity record against existing entities, according to one embodiment of the invention. An entity may be a set of identity records believed to refer to the same person. The networked system 100 includes a computer 102. The computer 102 is connected to a data source 170 via a network 130. In one embodiment, the data source 170 is a relational database. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers and the data source 170 via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an identity resolution (IR) application 150 identity resolution, an inbound identity record 152, ER candidate-building keys 154, a query 156, entities 158, and a modified query 160. The storage 108 of the computer 102 includes the known generic keys 162. As used herein, known generic keys refer to ER candidate-building keys previously determined to be generic (i.e., to be unsuitable for building candidates for a given identity record). In one embodiment, the application 150 may match the inbound identity record 152 to at least one of the entities 158. The application 150 may retrieve the entities 158 from the data source 170, via the query 156. The application 150 may generate the query 156 from the ER candidate-building keys 154. The application 150 may determine the ER candidate-building keys 154 from the inbound identity record 152. These operations of the application 150 are further described below in conjunction with FIGS. 2 through 5.

Figure 2:
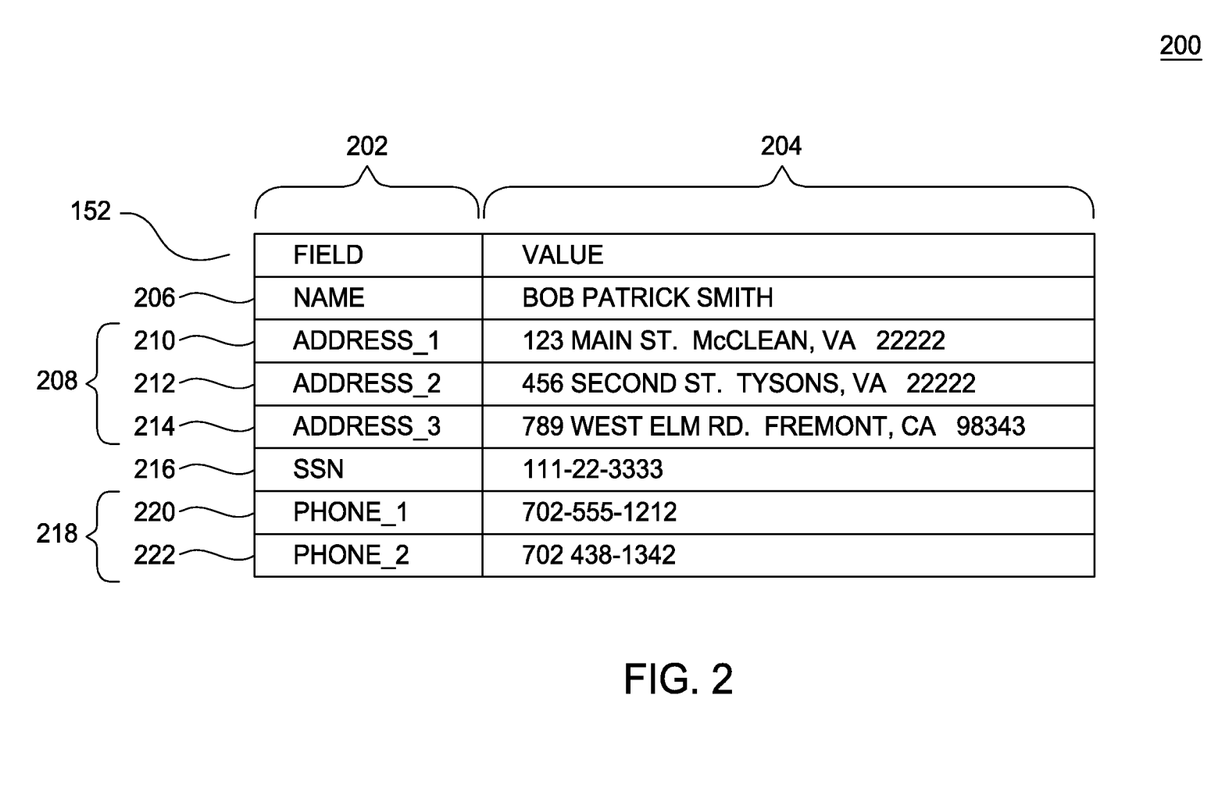
FIG. 2 illustrates an inbound identity record, according to one embodiment of the invention.

FIG. 2 illustrates an example of an inbound identity record, according to one embodiment of the invention. As described above, the application 150 may receive and match the inbound identity record 152 to at least one of the (existing) entities 158. As shown, the inbound identity record 152 includes fields 202 and values 204. The fields 202 include a name 206, addresses 208, a social security number (SSN) 216, and phone numbers 218. A name 206 of the inbound identity record 152 is "Bob Patrick Smith." A first address 210 of the inbound identity record 152 is "123 Main St. McClean Va. 22222." A second address 212 of the inbound identity record 152 is "456 Second St. Tysons Va. 22222." A third address 214 of the inbound identity record 152 is "789 West Elm Rd. Fremont Calif. 98343." An SSN 216 of the inbound identity record 152 is "111-22-3333." A first phone number 220 of the inbound identity record 152 is "702-555-1212." A second phone number 222 of the inbound identity record 152 is "702-438-1342." Of course, those skilled in the art will appreciate that the fields 202 of FIG. 2 are merely exemplary and are not intended to limit the scope of the disclosure.

Figure 3:
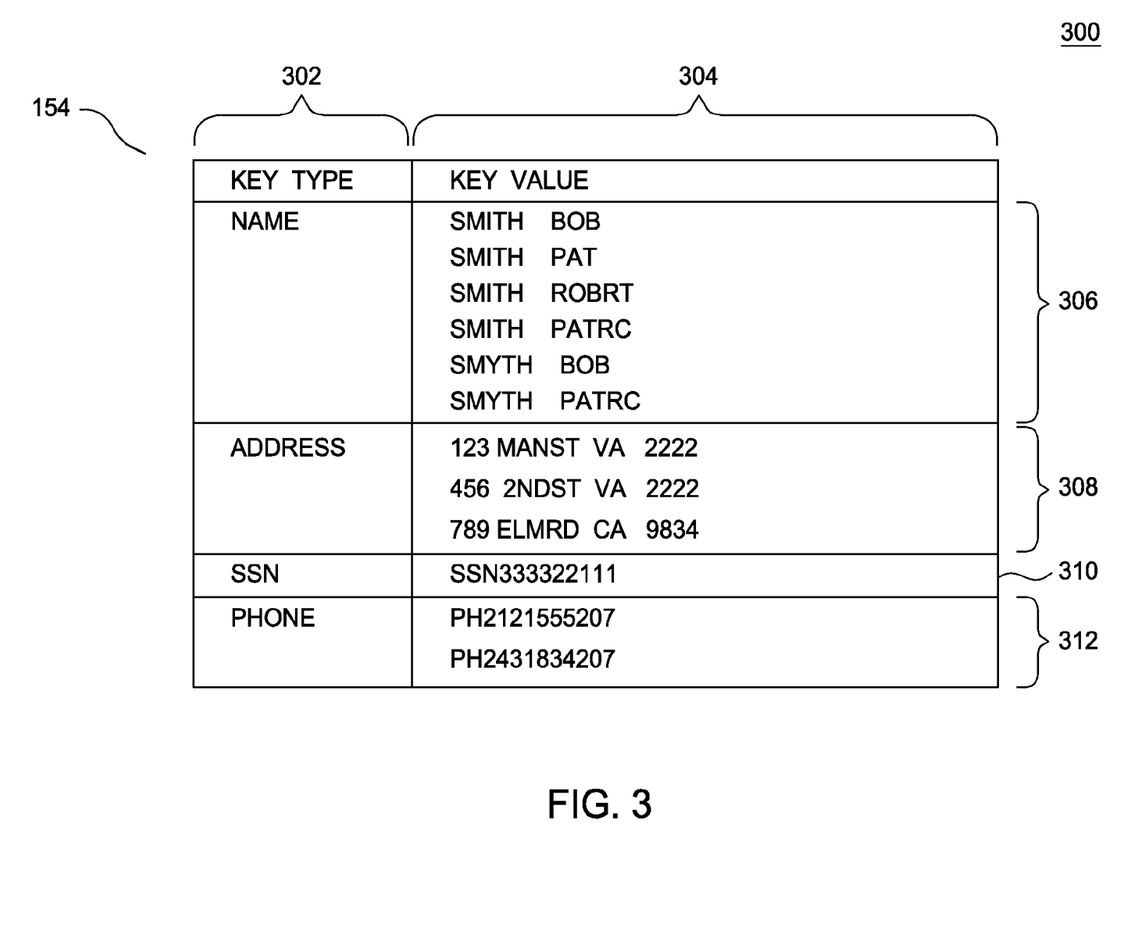
FIG. 3 illustrates entity resolution (ER) candidate-building keys, according to one embodiment of the invention.

FIG. 3 illustrates the ER candidate-building keys 154 of FIG. 1, according to one embodiment of the invention. The application 150 may generate the ER candidate-building keys 154 of FIG. 3 from the inbound identity record 152 of FIG. 2. By using the ER candidate-building keys 154 to construct queries, the application 150 may retrieve additional entities that closely (but not exactly) match one or more fields of the inbound identity record—i.e., records that otherwise may have been excluded from a query result. Advantageously, closely matching entities are included in a candidate set of entities (for matching against inbound identity record 152). Thus, the application 150 may retrieve entities 158 despite errors in the entities 158 or in the inbound identity record 158. The errors may include intentional errors, data entry errors, optical character recognition (OCR) errors, etc. Further, the degree of permissible error may be tailored to suit the needs of a particular case.

As shown in FIG. 3, the ER candidate-building keys 154 each include a key type 302 and a key value 304. The ER candidate-building keys 154 include "name" keys 306, "address" keys 308, an "SSN" key 310, and "phone" keys 312. The application 150 may generate—from the name 206 field (i.e., "Bob Patrick Smith") of the inbound identity record 152—the "name" keys: "Smith Bob", "Smith Pat", "Smith Robrt", "Smith Patrc", "Smyth Bob", and "Smyth Patrc". The application 150 may generate the "name" keys 306 based on predefined rules and/or a predefined mapping table, etc. For example, the predefined mapping table may include entries for two variants of the last name "Smith": "Smith" and "Smyth". A predefined rule may specify to concatenate the first name of the inbound identity record 152 with each variant of the last name of the inbound identity record 152.

Similarly, the application 150 may generate—from the addresses 208 of the inbound identity record 152—the "address" keys: "123 MANST Va. 2222", "456 2NDST Va. 2222", and "789 ELMRD Calif. 9834". That is, the application 150 may generate a shorthand representation of each value to facilitate matching. The application 150 may also generate—from the SSN 216 of the inbound identity record 152—the "SSN" key: "SSN333322111". In addition, the application 150 may generate—from the phone numbers 218 of the inbound identity record 152—the "phone" keys: "PH2121555207" and "PH2431834207".

In one embodiment, the application 150 may generate a query 156 for each key type 302 of FIG. 3. For example, the application 150 may generate the following query for the "address" keys 308 of the inbound identity record 152:

TABLE I

Query example

SELECT *
FROM address
WHERE key IN ('123 MANST VA 2222', '456 2NDST VA 2222', '789 ELMRD CA 9834');

This query retrieves entities having an "address" value that matches at least one of the three specified keys. The "address" key of the entities 158 may be precomputed and stored in the data source 170 or computed on-the-fly. Further, in generating the query 156, the application 150 may exclude keys in the query that are also present in a list of generic keys 162 (which is further described below). In another embodiment, the application 150 may generate a query 156 for all key values 304—and regardless of key type 302. Advantageously, by retrieving entities matching any of the three specified "address" keys, the application 150 may build a candidate set of entities more efficiently than issuing one query for each specified "address" key (i.e., a first query for "123 MANST Va. 222", a second query for "456 2NDST Va. 2222", etc.). Consequently, the application 150 may more efficiently match the inbound identity record 152 to at least one of the entities 158 identified using the ER candidate-building keys.

Of course, those skilled in the art will appreciate that multiple key values may be included in a query in other ways, without departing from the scope of the invention. For example, the query of Table I may also be expressed as "SELECT . . . WHERE key='123 MANST Va. 2222' OR key='456 2NDST Va. 2222' OR . . . ."

As described above, a generic key refers to an ER candidate-building key that matches too many entities to be helpful in resolving the inbound identity record to known entities. Some of the ER candidate-building keys generated by the application 150 may be unhelpful for identifying a single individual. That is, an ER candidate-building key may be a generic key—e.g., a key shared by many, many individuals. In one embodiment, to identify (and subsequently remove) these generic keys, the application 150 may execute the query 156 to retrieve the entities 158 from the data source 170. The application 150 may count the number of entities 158 matching each key value specified in the query 156. For example, if the query 156 retrieves the six variants for the "name" key 306 (e.g., WHERE key IN (Smith Bob', 'Smith Pat', . . . )), the application 150 may count the number of entities 158 matching "Smith Bob". Assume that the query 156 for the "name" key 306 has retrieved at least 1200 records. Further, assume that the application 150 has defined a threshold count of 1000 records for a generic key. If the application 150 determines that of the 1200 records, 1000 records matched the key "Smith Bob", the application 150 may designate "Smith Bob" as a generic key.

In one embodiment, the application 150 may remove the generic key (and/or any matching entities) from the current candidate-building procedure. The application 150 may also remove the generic key from future candidate-building procedures. For example, the application 150 may add the generic key to a list of known generic keys 162. The application 150 may exclude keys in the list from any subsequently-generated query 156.

As described above, the application 150 may remove the generic key and/or any matching entities from the current candidate-building procedure. For example, after designating the key "Smith Bob" as a generic key, the application 150 may resume processing entities 158 from the data source 170.

Assume that the query 156 for the "name" key 306 retrieves a total of 2200 entities—of which 1000 match the key "Smith Bob". In one embodiment, the application 150 may remove the 1000 entities matching the key "Smith Bob", to produce a candidate set of 1200 entities (that match the other five variants for the "name" key 306). The application 150 may subsequently only match the inbound identity record 152 against the candidate set of 1200 entities (and not against the 1000 entities matching the key "Smith Bob"). Advantageously, by only having to match against 1200 (instead of a total of 2200) entities, the application 150 may more efficiently determine matches for the inbound identity record 152—especially for matching operations that are more computationally expensive.

In one embodiment, the application 150 may also define an exit condition specifying when the application 150 should abort executing and/or processing the query 156. For example, assume that the query 156 for the "name" key 306 retrieves over two million entities for the key "Smith Bob". The cost of processing these records may exceed any benefit obtained from combining the six variants of the "name" key (i.e., "Smith Bob", "Smith Pat", etc.) into a (single) query 156. That is, the application 150 may have avoided processing two million records by issuing six separate queries, each with a predefined limit of 1000 entities.

In one embodiment, the application 150 may combine the six variants of the "name" key into a query 156 while avoiding processing two millions records—thereby realizing both of the benefits described above. The application 150 may define an exit condition of "any key exceeding the threshold count for an identity record". As described above, assume that the threshold count for generic keys is 1000 entities. If the key "Smith Bob" matches 1000 entities, the application 150 may designate the key "Smith Bob" as a generic key and the application 150 may nevertheless continue to process entities. Given the exit condition, however, when the key "Smith Bob" matches the 1001st identity record, the application 150 may abort executing/processing the query 156. For example, the application 150 may execute program instructions to close a record set object and/or discard any retrieved entities by setting a pointer to the record set object to NULL. As a result, depending on the way that the data source 170 is implemented, the data source 170 may also cease processing the query 156 and/or transmitting entities 158 to the application 150 through the network 130.

In one embodiment, after halting the execution of the query 156, the application 150 may generate a modified query 160 that excludes the key identified as being generic (e.g., "Smith Bob") from the query 156. The application 150 may execute the modified query 160 to retrieve entities 158 matching any of the keys in the modified query 160. The performance benefits of avoiding processing large numbers of records—i.e., the entities that would have matched the key "Smith Bob" were processing to continue beyond the 1001st record—may outweigh any performance cost of executing an additional query (i.e., the modified query 160). Advantageously, by halting the execution of the original query and issuing a modified query 160, the application 150 may more efficiently generate a set of candidate entities for the inbound identity record 152.

Of course, other exit conditions are broadly contemplated. In one embodiment, for example, the application 150 may define an exit condition of "processing 50 identity records subsequent to any key exceeding the predefined threshold count for generic keys." Continuing the above example, assume that the predefined threshold count for generic keys is 1000 entities. Once the key "Smith Bob" matches the 1000th identity record, the application 150 may process up to 50 additional identity records before aborting the query 156 (and generating a modified query 160 that excludes the generic key "Smith Bob").

As another example, in one embodiment, the application 150 may define an exit condition of "identifying two generic keys during execution of a given query". Continuing the above example, assume that the predefined threshold count for generic keys is 1000 unique entities. Assume also that the keys "Smith Bob" and "Smith Pat" have each matched 999 entities. If the next two entities match "Smith Bob" and "Smith Pat", respectively, then the application 150 may determine that the exit condition is satisfied. The application 150 may then abort the query 156—and generate a modified query 160 that excludes both generic keys "Smith Bob" and "Smith Pat".

In one embodiment, the exit condition may be a composite exit condition. That is, the exit condition may be composed over a multiple exit conditions and using logical operators such as AND, OR, NOT, XOR, etc. For instance, the application 150 may define an exit condition by ORing together the three exit conditions described above—e.g., to define a composite exit condition of "any key exceeding the predefined threshold count for generic keys by W entities OR processing X entities subsequent to any key exceeding the predefined threshold count Y for generic keys OR identifying Z generic keys during execution of a given query." Of course, those skilled in the art will appreciate that the values of W, X, Y and Z may be tailored to suit the needs of a particular case. However, the values of W=1, X=50, Y=1000, and Z=2 have proven useful in some cases. Further, an exit condition may also apply to modified queries. If the application 150 aborts the modified query, the application 150 may issue a second modified query, and so forth.

Figure 4:
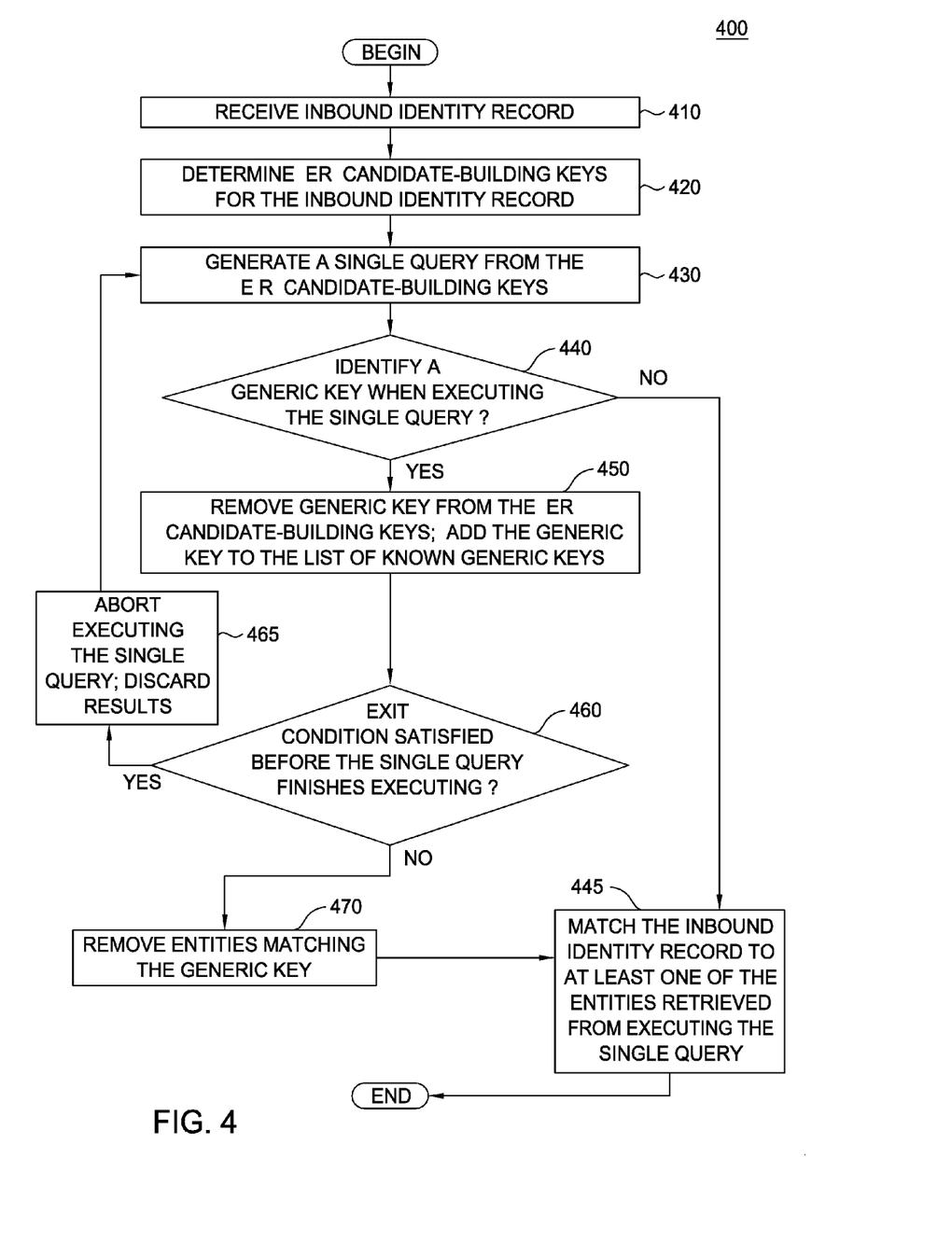
FIG. 4 is a flowchart depicting a method for matching the inbound identity record to existing entities, according to one embodiment of the invention.

FIG. 4 is a flowchart depicting a method 400 for matching the inbound identity record to existing entities, according to one embodiment of the invention. As shown, the method 400 begins at step 410, where the application 150 receives the inbound identity record 152—e.g., as illustrated in FIG. 2. At step 420, the application 150 may determine a collection of ER candidate-building keys for the inbound identity record 152. For example, the application 150 may determine multiple keys for each field of the inbound identity record 152 based on a mapping table. At step 430, the application 150 may generate a query from the ER candidate-building keys—e.g., the query illustrated in Table I. At this step, the application 150 may also remove keys from the query based on a list of known generic keys.

In one embodiment, if the application does not identify any generic keys when executing the query 156 (step 440), the application 150 may match the inbound identity record 152 against the entities 158 retrieved from executing the query 156 (step 445). After the step 445, the method 400 terminates.

On the other hand, if the application 150 identifies a generic key when executing the query 156 (step 440), the application 150 may remove the generic key from the ER candidate-building keys (step 450). The application 150 may also add the generic key to the list of known generic keys. At step 460, the application 150 determines whether the exit condition is satisfied before the query 156 finishes executing. If so, the application 150 aborts executing the query 156 (step 465). The application 150 may also discard any results thus far retrieved from executing the query 156. After step the 465, the application 150 may return to the step 430 to generate a modified query that includes the ER candidate-building keys less the generic key.

However, if the exit condition is not satisfied before the query 156 finishes executing (step 460), the application 150 may remove entities matching the generic key from the set of entities 158 retrieved from (fully) executing the query 156 to produce a modified set of entities(step 470). After the step 470, the application 150 may proceed to the step 445 to match the inbound identity record 152 against the modified set of entities 158. Once matches are determined, the application 150 may generate an alert (e.g., to notify a user of the matches). As described above, after the step 445, the method 440 terminates.

Figure 5:
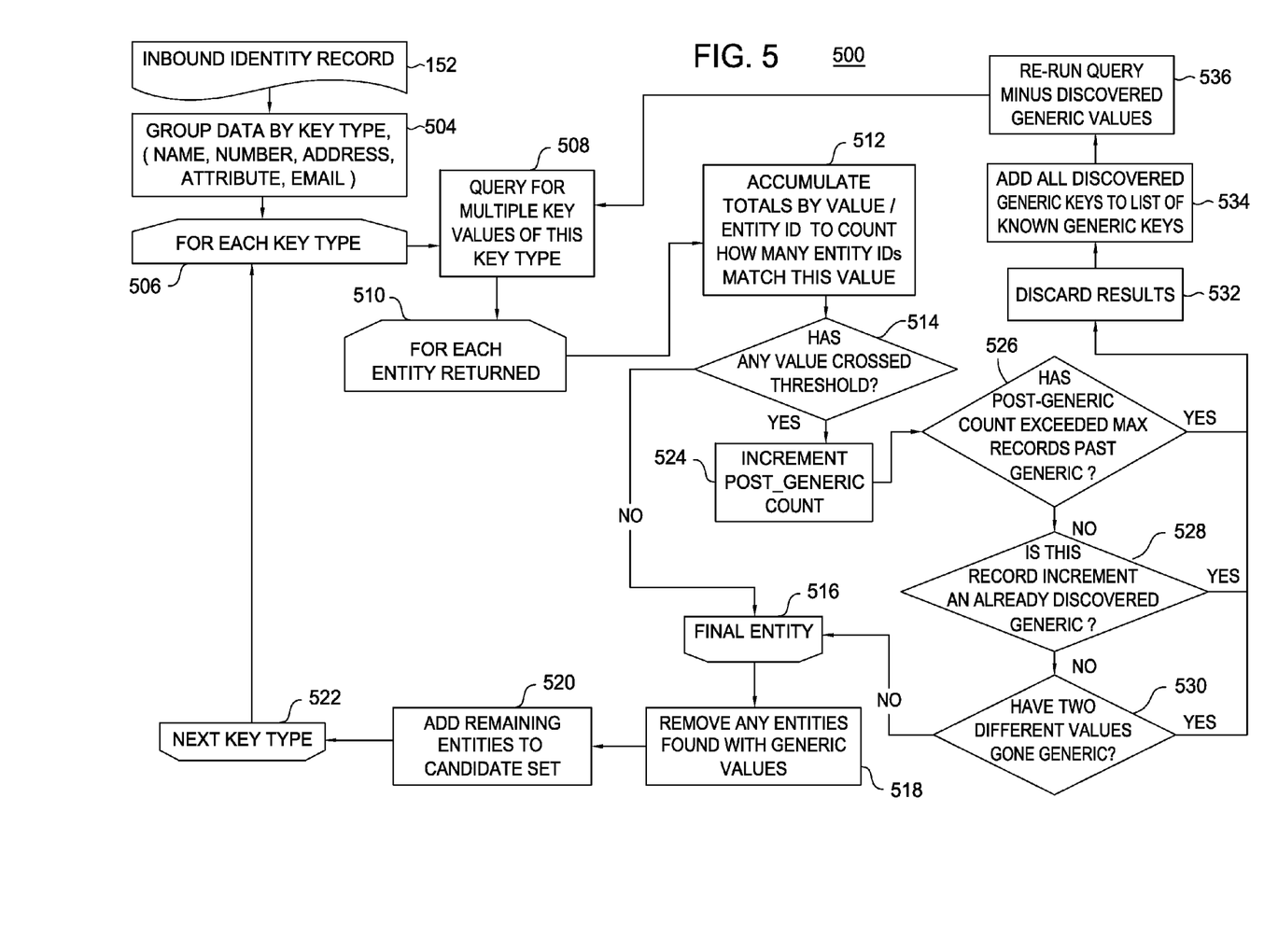
FIG. 5 is a flowchart depicting a method for matching the inbound identity record to existing entities using a composite exit condition, according to one embodiment of the invention.

FIG. 5 is a flowchart depicting a method 500 for matching the inbound identity record 152 to existing entities using a composite exit condition, according to one embodiment of the invention. The steps of the method 500 correspond to the steps 410 through 470 of FIG. 4. As shown, the method 500 begins at step 504, where the application 150 groups keys generated from an inbound identity record 152 by key type (e.g., name, address, SSN, phone number, email, etc.). At step 506, the application 150 enters a loop to retrieve candidate entities for a given key type. At step 508, the application 150 issues a query 156 that may include multiple values for the given key type. For example, if the key type is "name", the query 156 may include multiple name keys: "Smith Bob", "Smith Pat", etc. At this step, the application may also remove any key values from the query 156 that match a list of known generic keys.

At step 510, the application 150 enters a loop to process each identity record 158 retrieved from executing the query 156. At step 512, the application 150 keeps count of the number of entities 158 matching each key value included in the query 156. At step 514, the application 150 determines whether any count has exceeded the threshold count for generic keys. If not, the application 150 may process a next record, repeating the steps 512 and 514.

However, if the next record is the final record retrieved from executing the query 156 (step 516), the application 150 may remove any entities matching generic keys at step 518 (in this case, none). The application 150 may then add the entities 158 to a candidate set of entities (step 520). The application 150 may then process a next key type (steps 522 and 506). In this way, the application 150 constructs a candidate set of entities, one key type at a time. Each key type may contribute additional entities to the candidate set of entities.

On the other hand, if the application 150 determines at step 514 that a count has exceeded the threshold count for generic keys, the application 150 may increment a post-generic counter (step 524). The application 150 may then evaluate the composite exit condition. For example, the application 150 may evaluate whether the post-generic counter has exceeded a threshold number of records subsequent to identifying a generic key (step 526). The application 150 may also evaluate whether a next record matches an identified generic key (step 528). The application 150 may also evaluate whether two generic keys have been identified (step 530). If any of these three conditions are met, the application 150 may discard any entities thus far retrieved from executing the query 156 (step 532). The application 150 may also add any identified generic keys to the list of known generic keys (step 534). The application 150 may then re-execute a modified query that excludes the identified generic keys (step 536). That is, the application 150 may return to the step 508 to execute the modified query.

However, if none of the three conditions are met, the application 150 proceeds to the step 516 to finish retrieving entities 158 for the query 156. After the application 150 processes the final key type (step 520), the method 500 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for matching an inbound identity record to existing entities. In one embodiment, an application for entity resolution may determine entity resolution (ER) candidate-building keys for an inbound identity record. The application may generate a query for multiple ER candidate-building keys. When processing entities retrieved from executing the query, the application may identify one of the multiple ER candidate-building keys to be a generic key. Upon determining that an exit condition involving the generic key is satisfied, the application 150 may abort retrieving/processing entities from the query. The application 150 may execute a modified query that excludes the generic key. Advantageously, the application may reduce the count of network trips between the application and a data source storing existing entities, while also avoiding processing large numbers of entities matching generic keys. Consequently, the application may more efficiently construct a set of candidate entities for matching the inbound identity record.

While the foregoing is directed to embodiments of the present invention, other and further embodiments of the invention may be devised without departing from the basic scope thereof, and the scope thereof is determined by the claims that follow.

What is claimed is:

1. A computer-implemented method to halt execution of queries containing entity resolution (ER) candidate-building keys unsuitable for generating a restricted set of candidate entities against which to match a received identity record, the method comprising:
receiving an identity record;
determining a plurality of ER candidate-building keys for the received identity record;
generating a query from one or more of the plurality of ER candidate-building keys to retrieve entities matching any of the one or more ER candidate-building keys, wherein the one or more ER candidate-building keys are derived from at least a field of the received identity record; and
upon determining, during execution of the query and by operation of one or more computer processors, that at least a first ER candidate-building key of the one or more ER candidate-building keys is unsuitable for generating a restricted set of candidate entities against which to match the received identity record, aborting executing the query, wherein the restricted set of candidate entities is selected from a plurality of available entities greater in number than the restricted set of candidate entities.

2. The computer-implemented method of claim 1, further comprising:
   removing the unsuitable ER candidate-building key from the query to produce a modified query.

3. The computer-implemented method of claim 1, wherein the unsuitable ER candidate-building key comprises a ER candidate-building key that has retrieved a count of entities beyond a predefined threshold count.

4. The computer-implemented method of claim 1, wherein the executing of the query is aborted upon further determining that the query has retrieved a count of entities beyond a predefined threshold count, subsequent to the unsuitable ER candidate-building key being identified.

5. The computer-implemented method of claim 1, wherein the executing of the query is aborted upon further determining that the unsuitable ER candidate-building key has retrieved a count of entities beyond a predefined threshold count, subsequent to being identified as the unsuitable ER candidate-building key.

6. The computer-implemented method of claim 1, wherein the executing of the query is aborted upon further identifying another unsuitable ER candidate-building key from the one or more ER candidate-building keys.

7. The computer-implemented method of claim 1, further comprising:
   upon determining that each of the one or more ER candidate-building keys are suitable for generating the restricted set of candidate entities against which to match the received identity record, allowing the query to complete execution, to obtain the restricted set of candidate entities for the received identity record, wherein the received identity record is matched against the restricted set of candidate entities to resolve the received identity record to a first candidate entity of the restricted set of candidate entities.

8. The computer-implemented method of claim 7 wherein the identity record includes one or more fields each containing a respective field value, wherein the plurality of ER candidate-building keys are generated based on the one or more fields included in the identity record, wherein each ER candidate-building key is a distinct variant of a field value contained in the identity record.

9. The computer-implemented method of claim 8, wherein the identity record is matched against each candidate entity in the restricted set of candidate entities and not matched against at least one available entity not in the restricted set of candidate entities, to avoid incurring processing costs associated with matching against the at least one available entity.

10. The computer-implemented method of claim 9, wherein the unsuitable ER candidate-building key is disqualified from ER candidate building, so as to facilitate removal of the unsuitable ER candidate-building key from one or more subsequent queries, prior to execution of the one or more subsequent queries, wherein one or more modified subsequent queries are generated, wherein execution of the query is aborted upon determining that the first ER candidate-building key is unsuitable comprises determining that a predefined unsuitability condition is satisfied.

11. The computer-implemented method of claim 10, wherein the method is performed by an identity resolution application, wherein the identity resolution application is configured to determine that the first ER candidate-building key is unsuitable based on each predefined unsuitability condition of:: (i) a first unsuitability condition comprising the first ER candidate-building key retrieving a count of candidate entities beyond a first predefined threshold count; (ii) a second unsuitability condition comprising the first ER candidate-building key retrieving a count of candidate entities beyond a second threshold count subsequent to retrieving the first predefined threshold count of candidate entities; and (iii) a third unsuitability condition comprising the first ER candidate-building key and a second ER candidate-building key each retrieving a respective count of candidate entities beyond a respective predefined threshold count.

12. The computer-implemented method of claim 11, wherein any candidate entities retrieved by the first ER candidate-building key are discarded upon determining that the first unsuitability condition is satisfied and that the query is not halted, wherein at least one candidate entity retrieved by a third ER candidate-building key of the one or more ER candidate-building keys is not discarded;
   wherein the restricted set of candidate entities is discarded upon determining that the query is halted due to the third unsuitability condition being satisfied;
   wherein the one or more ER candidate-building keys comprises two or more ER candidate building keys, and wherein the method further comprises:
   removing the unsuitable ER candidate-building key from the query to produce a modified query;
   executing the modified query to retrieve a restricted set of candidate entities matching the two or more ER candidate-building keys less the unsuitable ER candidate-building key.

13. A computer-readable storage medium containing a program which, when executed, performs an operation to halt execution of queries containing entity resolution (ER) candidate-building keys unsuitable for generating a restricted set of candidate entities against which to match a received identity record, the operation comprising:
   receiving an identity record;
   determining a plurality of ER candidate-building keys for the received identity record;
   generating a query from one or more of the plurality of ER candidate-building keys to retrieve entities matching any of the one or more ER candidate-building keys, wherein the one or more ER candidate-building keys are derived from at least a field of the received identity record; and
   upon determining, during execution of the query and by operation of one or more computer processors when executing the program, that at least a first ER candidate-building key of the one or more ER candidate-building keys is unsuitable for generating a restricted set of candidate entities against which to match the received identity record, aborting executing the query, wherein the restricted set of candidate entities is selected from a plurality of available entities greater in number than the restricted set of candidate entities.

14. The computer-readable storage medium of claim 13, wherein the operation further comprises:
   removing the unsuitable ER candidate-building key from the query to produce a modified query.

15. The computer-readable storage medium of claim 14, wherein the unsuitable ER candidate-building key comprises a ER candidate-building key that has retrieved a count of entities beyond a predefined threshold count.

16. The computer-readable storage medium of claim 15, wherein the executing of the query is aborted upon further determining that the query has retrieved a count of entities beyond a predefined threshold count, subsequent to the unsuitable ER candidate-building key being identified.

17. The computer-readable storage medium of claim 16, wherein the executing of the query is aborted upon further determining that the unsuitable ER candidate-building key has retrieved a count of entities beyond a predefined threshold count, subsequent to being identified as the unsuitable ER candidate-building key.

18. The computer-readable storage medium of claim 17, wherein the executing of the query is aborted upon further identifying another unsuitable ER candidate-building key from the one or more ER candidate-building keys.

19. A system to halt execution of queries containing entity resolution (ER) candidate-building keys unsuitable for generating a restricted set of candidate entities against which to match a received identity record, the system comprising:
  one or more computer processors;
  a memory containing a program which, when executed by the one or more computer processors, is configured to perform an operation comprising:
    receiving an identity record;
    determining a plurality of ER candidate-building keys for the received identity record;
    generating a query from one or more of the plurality of ER candidate-building keys to retrieve entities matching any of the one or more ER candidate-building keys, wherein the one or more ER candidate-building keys are derived from at least a field of the received identity record; and
    upon determining, during execution of the query, that at least a first ER candidate-building key of the one or more ER candidate-building keys is unsuitable for generating a restricted set of candidate entities against which to match the received identity record, aborting executing the query, wherein the restricted set of candidate entities is selected from a plurality of available entities greater in number than the restricted set of candidate entities.

20. The system of claim 19, wherein the operation further comprises:
  removing the unsuitable ER candidate-building key from the query to produce a modified query.

21. The system of claim 19, wherein the unsuitable ER candidate-building key comprises a ER candidate-building key that has retrieved a count of entities beyond a predefined threshold count.

22. The system of claim 19, wherein the executing of the query is aborted upon further determining that the query has retrieved a count of entities beyond a predefined threshold count, subsequent to the unsuitable ER candidate-building key being identified.

23. The system of claim 19, wherein the executing of the query is aborted upon further determining that the unsuitable ER candidate-building key has retrieved a count of entities beyond a predefined threshold count, subsequent to being identified as the unsuitable ER candidate-building key.

24. The system of claim 19, wherein the executing of the query is aborted upon further identifying another unsuitable ER candidate-building key from the one or more ER candidate-building keys.

* * * * *